(12) United States Patent  (10) Patent No.: US 8,230,798 B2
Rohden                    (45) Date of Patent:     Jul. 31, 2012

(54) MAGNUS ROTOR

(75) Inventor: Rolf Rohden, Aurich (DE)

(73) Assignee: Aloys Wobben, Aurich (DE)

( * ) Notice: Subject to any disclaimer, the term of this patent is extended or adjusted under 35 U.S.C. 154(b) by 271 days.

(21) Appl. No.: 12/324,729

(22) Filed: Jun. 15, 2009

(65) Prior Publication Data

US 2009/0241820 A1    Oct. 1, 2009

Related U.S. Application Data

(63) Continuation-in-part of application No. PCT/EP2007/004816, filed on May 31, 2007.

(30) Foreign Application Priority Data

May 31, 2006 (DE) .......................... 10 2006 025 732

(51) Int. Cl.
    *B63B 35/00* (2006.01)
(52) U.S. Cl. ............................. 114/39.3; 416/1; 416/4
(58) Field of Classification Search ................ 114/39.3; 416/1, 4; 244/10, 21
    See application file for complete search history.

(56) References Cited

U.S. PATENT DOCUMENTS

| 1,674,169 A | 6/1928 | Flettner |
| 4,228,563 A | 10/1980 | Weber |
| 4,398,895 A | 8/1983 | Asker |
| 4,401,284 A | 8/1983 | Austin |
| 4,446,379 A | 5/1984 | Borg et al. |
| 4,602,584 A | 7/1986 | North et al. |
| 5,176,581 A | 1/1993 | Kumm |
| 6,848,382 B1 | 2/2005 | Bekker |

FOREIGN PATENT DOCUMENTS

| AT | 110303 B | 8/1928 |
| BE | 895044 | 3/1983 |
| DD | 243251 A1 | 2/1987 |

(Continued)

OTHER PUBLICATIONS

Rizzo, "The Flettner Rotor Ship in the Light of the Kutta-Joukowski Theory and of Experimental Results," Technical Notes, National Advisory Committee for Aeronautics, No. 228, XP007904471, Washington, Oct. 1925, 29 pages.

(Continued)

*Primary Examiner* — Lars A Olson
(74) *Attorney, Agent, or Firm* — Seed IP Law Group PLLC

(57) ABSTRACT

The present invention concerns a Magnus rotor comprising a drive and a control means which controls the drive in such a way that the Magnus rotor attains a peripheral speed which is greater than the mean wind speed by a factor $\lambda$. In addition the present invention concerns a method of operating a Magnus rotor comprising a drive which causes the Magnus rotor to rotate, and a control means, as well as a ship. In order better to utilize the action of the Magnus rotor than occurs in the state of the art, $\lambda$ is greater than 4. In that respect the present invention is based on the realization that the assumption that, above a high-speed factor of four, there would no longer be a significant increase in the lift coefficient, which above all is in relation to the drive power to be used, is based on a technical prejudice. It was possible to empirically ascertain that an increase in the high-speed factor leads to a significantly higher lift coefficient. Accordingly there is also a higher power output from the Magnus rotor.

20 Claims, 7 Drawing Sheets

FOREIGN PATENT DOCUMENTS

| | | |
|---|---|---|
| DE | 422057 | 11/1925 |
| DE | 2430630 A | 4/1976 |
| DE | 2447861 A | 4/1976 |
| DE | 2908159 A1 | 9/1979 |
| DE | 4101238 A1 | 7/1992 |
| DE | 69218428 T2 | 12/1992 |
| DE | 19952460 A1 | 5/2001 |
| DE | 10102740 A1 | 8/2002 |
| DE | 10334481 A1 | 3/2005 |
| DE | 102005028447 A1 | 12/2006 |
| GB | 2187154 A | 9/1987 |
| GB | 2332891 A | 7/1999 |
| JP | 56-57470 | 5/1981 |
| JP | 57-55292 | 4/1982 |
| JP | 63-195998 | 12/1998 |
| JP | 2005-256606 | 9/2005 |
| WO | 2006133950 A2 | 12/2006 |

OTHER PUBLICATIONS

Shipbuilding, "Rotosail to enter commercial service on 445 dwt ship," Schiff & Hafen, No. 7, XP-002079444, Hamburg Deutschland, Jul. 1985, 2 pages.

"Hybrid rotors for wind propulsion," Marine Engineers Review, Sep. 1, 1991, London, GB, pp. 54-55.

Wagner, "Die Segalmaschine," Ernst Kabel Verlag GmbH, Hamburg, 1991, pp. 154-175.

Risch et al., "Windschiffe, "VEB Verlag Technik, XP-002475509, Berlin, 1998, 5 pages.

PCT International Search Report from counterpart PCT/EP2007/004816, 22 pages, Apr. 22, 2008.

MAGNUS ROTOR

The present invention concerns a Magnus rotor comprising a drive and a control means which controls the drive in such a way that the Magnus rotor attains a peripheral speed which is greater than the mean wind speed by a factor λ. In addition the present invention concerns a method of operating a Magnus rotor comprising a drive which causes the Magnus rotor to rotate, and a control means, as well as a ship.

Magnus rotors are known in the state of the art. They have also become known by the term Flettner rotors in particular as ship propulsion drives and the book 'Die Segelmaschine' by Klaus D Wagner, Ernst Kabel Verlag GmbH, Hamburg, 1991, describes equipping ships with such a Flettner rotor or Magnus rotor. That book already specifies a high-speed mode or factor (=λ), as the ratio of peripheral speed to the speed of the afflux wind, at a value of four (see 'Die Segelmaschine', loc. cit., page 65, line 3). With that high-speed factor there is a lift coefficient of the order of magnitude of ten (the book indicated refers to a value of nine).

As general state of the art attention is directed to the following documents: DE 10 2005 028 447 A1, the German book: 'Windschiffe' by Helmut Risch, Jochen Bertholdt, VEB Verlag Technik, Berlin 1998, pages 62/63, DE 24 30 630 A1, U.S. Pat. No. 4,398,895, DE 692 18 428 T2, DE 103 34 481 A1, DE 29 08 159 A1 and DE 24 47 861 A1.

The object of the present invention is to better utilise the Magnus rotor in its effect, than occurs in the state of the art.

That is achieved in a Magnus rotor of the kind set forth in the opening part of this specification, by $\lambda > 4$.

In that respect the present invention is based on the realisation that the assumption that, above a high-speed factor of four, there would no longer be a significant increase in the lift coefficient, which above all is in relation to the drive power to be used, is based on a technical prejudice. It was possible to empirically ascertain that an increase in the high-speed factor leads to a significantly higher lift coefficient. Accordingly there is also a higher power output from the Magnus rotor.

In an advantageous development $5 \leq \lambda \leq 20$ is implemented and in particular $5 \leq \lambda \leq 10$. Upon operation of the Magnus rotor in that range the lift coefficient achieved on the one hand and the required drive power and the loadings on the Magnus rotor on the other hand are in a particularly advantageous relationship with each other.

In a preferred embodiment arranged in the interior of the Magnus rotor is a carrier which carries the Magnus rotor by way of a bearing means. In that way the Magnus rotor remains externally aerodynamically clean and at the same time the carrier and also the bearing means are protected from effects of the weather.

Particularly preferably there are provided at least three guide rollers which are spaced uniformly at the lower outer periphery and which bear play-free against the Magnus rotor. Those guide rollers ensure that, irrespective of the height of the carrier in the interior of the Magnus rotor and the height, related thereto, of the bearing means, the Magnus rotor cannot perform any flapping movements which are superimposed on the rotary movement. Thus on the one hand the Magnus rotor is uniformly guided while on the other hand the bearing means is not subjected to moments resulting from possible deflection of the rotor. That in turn is beneficial to the service life of the bearing means.

To reduce or even entirely eliminate the generation of noise by the guide rollers running on the Magnus rotor each guide roller has an elastic covering on its outer peripheral surface. That elastic covering can be for example a hard rubber mixture, a plastic material or another suitable material which on the one hand reduces or suppresses the rolling noise between the guide roller and the Magnus rotor and which on the other hand involves the lowest possible amount of wear.

Alternatively or additionally each guide roller is mounted in vibration-damped relationship. In that case vibration damping can be achieved by rubber dampers. As an alternative to the elastically covered guide roller the vibration-damped bearing means can eliminate the predominant part of the noise involved while optimum noise elimination is achieved by a combination of elastically covered guide roller and vibration-damped bearing means for the guide roller.

As the guide rollers continuously roll against the lower outer periphery of the Magnus rotor, a corresponding wear will occur there. A worn guide roller can be replaced. In order not at some time to have to change a Magnus rotor which has been worn by the guide rollers, provided at the lower outer periphery of the Magnus rotor is a guide track on which the guide rollers roll. That guide track is preferably formed by segmented steel plates which if required can be replaced segment-wise. In that fashion guidance of the Magnus rotor can easily be maintained in good working order and the Magnus rotor itself is not subjected to any wear due to the guide rollers or also damage due to foreign bodies between the guide track and the guide rollers.

In a particularly advantageous development the Magnus rotor is driven by a drive belt which bears by a predetermined amount against the lower outer periphery of the Magnus rotor. The predetermined amount can be for example $\pi/2$ or also $2\pi/3$, according to the demands involved. With that drive, the application of force occurs not just by way of individual tooth flanks of a pinion but over the entire contact surface between the Magnus rotor and the drive belt. That is considerably less susceptible to trouble than conventional drives and the individual drive components can be replaced if required without any problem. In addition for example the Magnus rotor itself does not have a ring gear which could be damaged and would then have to be repaired. To make the Magnus rotor here unsusceptible to wear, at least the region of the lower outer periphery of the Magnus rotor in which the drive belt bears against the Magnus rotor is of steel.

The drive itself is preferably implemented by a guide arrangement for the drive belt by way of three rollers of which at least one is driven. From that driven roller, the force is then transmitted to the Magnus rotor itself by way of the belt which bears snugly against the outer periphery of the Magnus rotor.

In order to be able to counteract changes in length of the drive belt, for example as a consequence of thermal influences and concomitant changes in the tension of the drive belt, and also to be able to compensate for an increase in the length of the drive belt due to the drive forces acting thereon, there is particularly preferably provided a tensioning roller displaceable in the radial direction of the Magnus rotor. In that way the belt tension and therewith also the tension with which the drive belt bears against the Magnus rotor can be influenced by the displacement of the tensioning roller. It is entirely clear to the man skilled in the art that such displacement can be effected manually or with simultaneous detection of the tension in the drive belt, also automatically using motor-driven displacement of the tensioning roller.

In a preferred development of the present invention there is provided a cover means which at least partially extends around the lower periphery of the Magnus rotor and covers the rollers for guiding the drive belt and the belt itself and the guide rollers. It is possible in that way on the one hand to prevent foreign bodies from penetrating into the drive and the guide rollers. On the other hand that eliminates a source of danger to the operating personnel because such a cover means can reliably prevent even accidental contact with the drive arrangement.

Particularly preferably the cover means is segmented in accordance with the components disposed therebeneath. To gain access to a guide roller accordingly only the corresponding segment of the cover means has to be removed, but not the entire cover means. That on the one hand saves time and complication and expenditure while on the other hand it maintains the safety aspect for the other parts such as for example the drive and the rollers for the drive belt still remain covered.

To achieve reliable operation of the Magnus rotor the first natural frequency of the Magnus rotor is greater than the highest rotary speed of the Magnus rotor. That ensures that the rotary speed of the Magnus rotor cannot in any case reach its first natural frequency and thus cause the Magnus rotor to perform resonance oscillations. In that respect it is clear to the man skilled in the art that the first natural frequency rises with increasing flexural stiffness and falls with increasing mass. The man skilled in the art is therefore in a position to dimension and design the Magnus rotor in such a way that its first natural frequency is of the desired value.

Accordingly the Magnus rotor is controlled in accordance with a method whereby it is operated at a rotary speed which is lower than its first natural frequency. That method therefore also ensures operation of the Magnus rotor at a rotary speed below its first natural frequency.

The method according to the invention of operating the Magnus rotor is preferably such that the drive is controlled in such a way that a high-speed factor of greater than four, preferably in the range of 5 to 20 and particularly preferably in the range of 5 to 10 is set. Accordingly the method according to the invention also takes account of the empirically ascertained realisation that, at higher high-speed factors, contrary to the prevailing technical prejudice, significantly higher lift coefficients and thus greater resulting forces are achieved.

In a particularly preferred configuration of the invention there is provided a ship equipped with at least one Magnus rotor according to the invention for producing propulsion force.

The invention is described in greater detail hereinafter by means of an embodiment. In the drawing.

Figure 1:
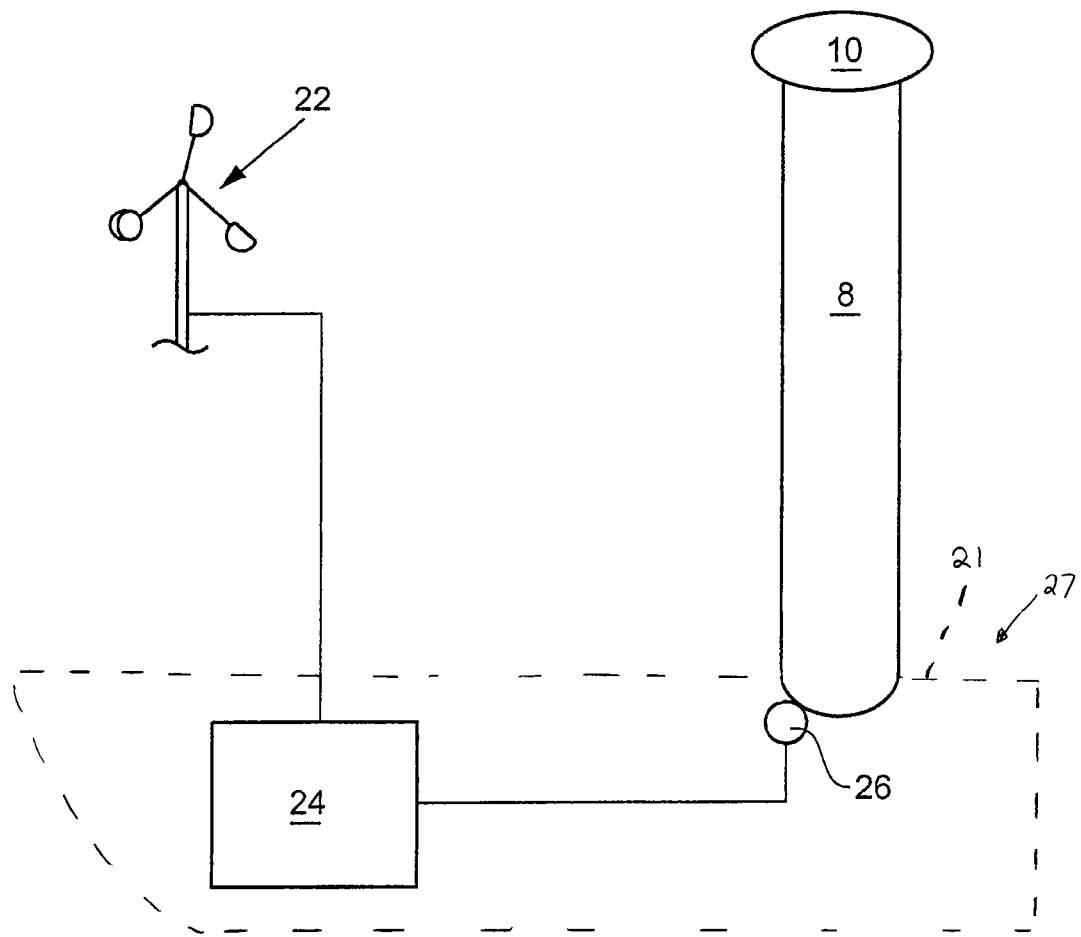
FIG. 1 shows a simplified view of the overall system.

FIG. 1 shows a Magnus rotor 8 with an end plate 10. That end plate improves the efficiency of the Magnus rotor 8 but is sufficiently known in the state of the art.

The Magnus rotor 8 is driven by means of a drive 26 which is controlled by a control means 24 in such a way that the peripheral speed of the Magnus rotor 8 is a multiple of the wind speed.

For that purpose the wind speed is measured for example by means of an anemometer 22 and fed to the control means 24 which then in turn suitably controls the drive 26. The rotary speed which is set is dependent on the diameter of the Magnus rotor 8 and can readily attain values of the order of magnitude of 400 or 500 revolutions per minute.

In that respect in practical operation the rotary speed is set, starting from a mean wind speed. That can be ascertained in known manner as a 10 minute mean value but naturally also over another period of time. The control means, on the basis of mean values, has on the one hand the advantage that the frequency of regulating interventions is kept within limits. On the other hand a stabilising effect is also added. More specifically, with the rotary speed of the Magnus rotor 8 remaining the same, if the wind speed temporarily increases, for example as a consequence of a positive gust, the high-speed factor automatically decreases and therewith the lift coefficient of the Magnus rotor; the force occurring at the Magnus rotor 8 therefore does not increase with the wind speed. Accordingly, in the event of a negative gust, that is to say a wind speed which briefly falls, the high-speed factor increases; the resulting force is therefore not noticeably reduced because of the increasing lift coefficient. With constantly changing wind speeds therefore a uniform rotary speed of the Magnus rotor results in the resulting force being kept constant.

Figure 2:
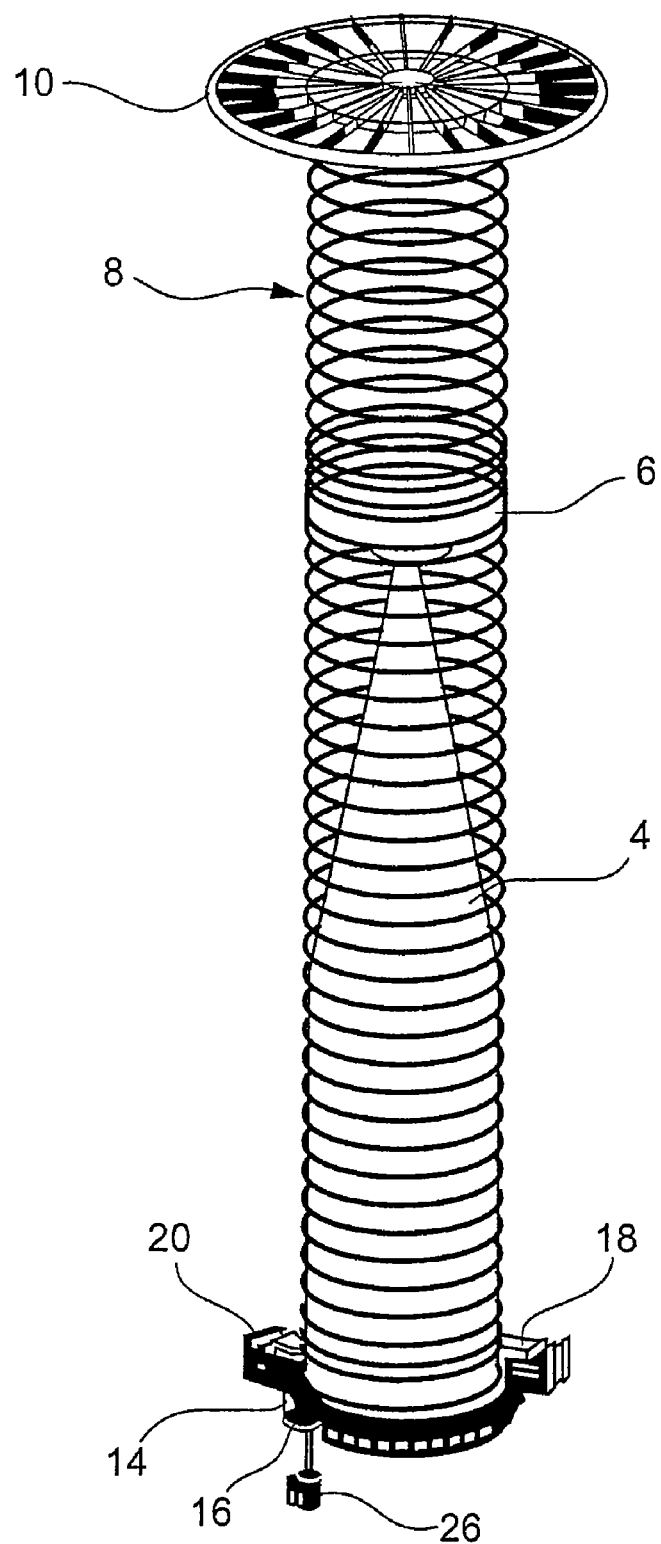
FIG. 2 shows a perspective view of the Magnus rotor.

The perspective view in FIG. 2 shows the Magnus rotor 8 according to the invention with an end plate 10 mounted at its upper end. Insofar as the Magnus rotor 8 is mounted on a base plate (not shown) such as for example the deck of a ship or the like, a corresponding end plate is not required at its lower end as that is formed by the plate or the deck itself. The Magnus rotor 8 is carried by a carrier 4 which is arranged in the interior of the Magnus rotor 8 and on which the Magnus rotor 8 rotates, with the aid of a bearing means 6. That bearing means can be a known rolling bearing or any other suitable configuration of a bearing.

The drive arrangement is shown at the lower peripheral edge of the Magnus rotor 8.

The drive force is applied by a drive 26 which drives a roller 16. A drive belt 14 passes around that roller 6 and is further guided over a direction-changing roller 18 and a tensioning roller 20. As those three rollers 16, 18, 20 are arranged around the centre point of the Magnus rotor 8 the drive belt 14 bears against the outer periphery of the Magnus rotor along a predetermined portion and entrains it by friction. The movement of the drive belt 14, produced by the drive 26, is thus transmitted to the Magnus rotor 8 and the latter is thus caused to rotate. That drive is shown in further detail with reference to FIG. 4.

Figure 3:
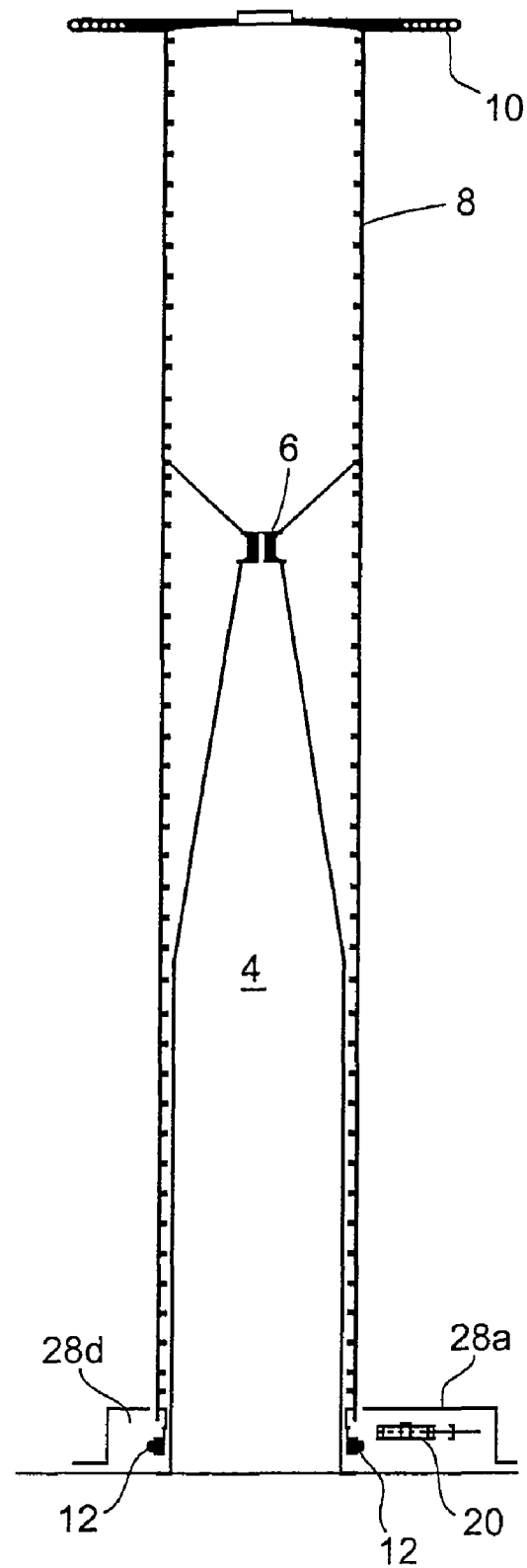
FIG. 3 shows a simplified side view of the Magnus rotor.

FIG. 3 shows a simplified sectional view of the Magnus rotor 8 according to the invention with the inwardly disposed carrier 4, the bearing means 6, the end plate 10 and the tensioning roller 20. This Figure also shows guide rollers 12 and cover means 28a, 28d.

The cover means 28a and 28d cover the lower peripheral edge of the Magnus rotor, the guide rollers 12 and also the drive, here shown in simplified form by the tensioning roller 20, and thus on the one hand prevent foreign bodies from getting into the drive or the guide rollers 12 and on the other hand prevent operating personnel from suffering injury at exposed rotating parts.

Figure 4:
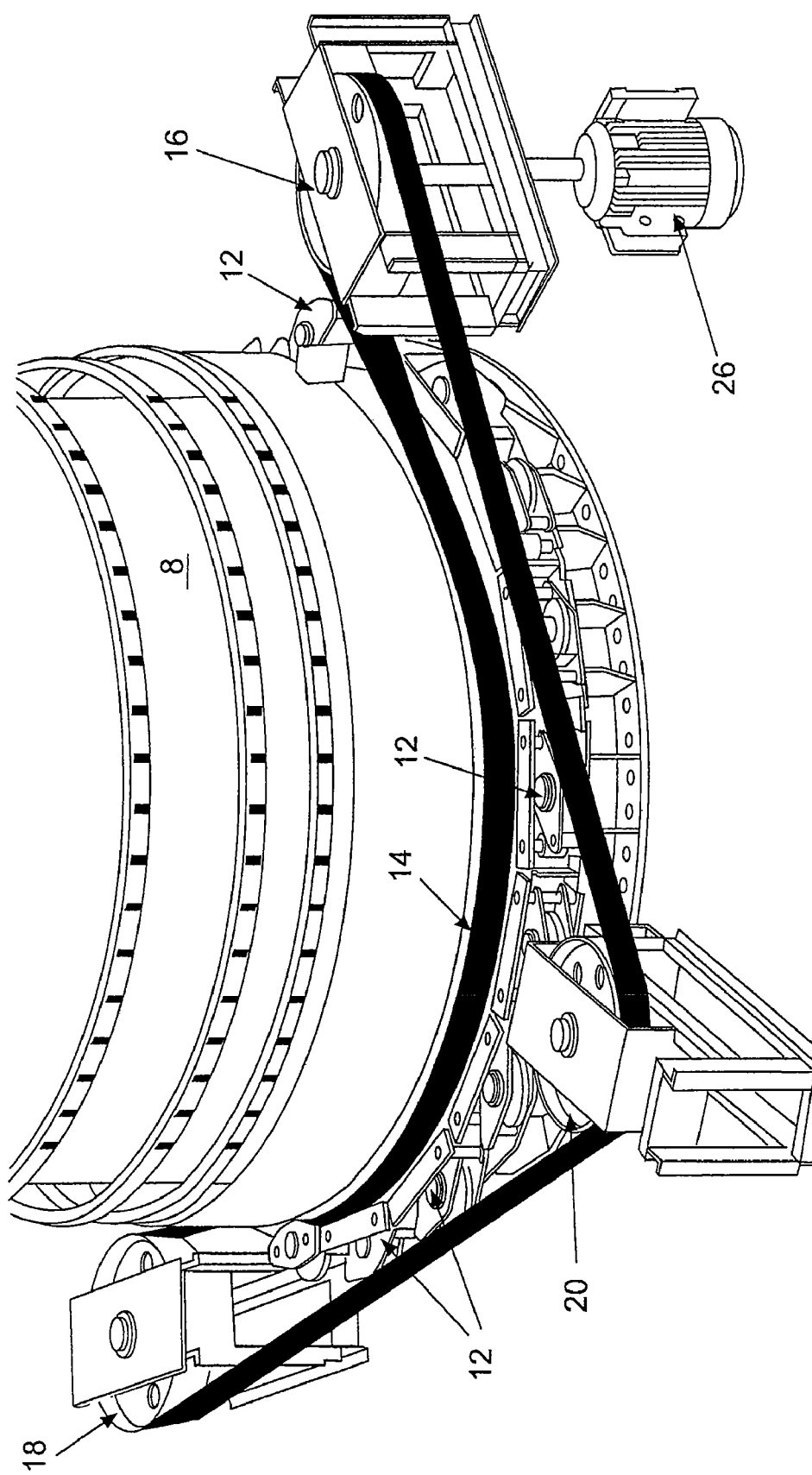
FIG. 4 shows a detail view of the drive and the guide arrangement for the Magnus rotor.

FIG. 4 shows details of the drive and the guide arrangement for the Magnus rotor 8. Guide rollers 12 are disposed at the lower peripheral edge of the Magnus rotor 8. Those guide rollers 12 are distributed over the entire periphery of the Magnus rotor 8 and bear in play-free relationship thereagainst. Even if therefore a tilting moment should occur for example due to a gust of wind and due to the bearing means being arranged relatively high (see for example FIG. 3), that cannot lead to a flapping movement of the Magnus rotor 8 as the guide rollers 12 reliably prevent that. This ensures that the Magnus rotor 8 always performs a precise rotational movement.

Furthermore this Figure clearly shows the drive belt 14 which also bears snugly against the outside periphery of the Magnus rotor 8 in the lower region thereof. Depending on the respective position of the rollers 16, 18, 20 around which the drive belt 14 passes, the drive belt 14 bears against the surface of the Magnus rotor 8 over an arcuate extent of for example $\pi/2$, $2\pi/3$ or even $\pi$ and in that way transmits the drive force to the Magnus rotor 8 by means of friction.

The drive belt 14 in turn is set in movement by a drive roller 16 which is acted upon with the corresponding force by a drive 26, for example an electric motor. From the drive roller 16 the drive belt 14 is guided along the Magnus rotor 8 to a direction-changing roller 18, from there further to a tensioning roller 20 and then back again to the drive roller 16. In the present example this therefore involves an endless drive belt.

In this Figure the tensioning roller 20 can be clearly seen as being displaceable in its position in the radial direction of the Magnus rotor 8. In that way the tension of the drive belt 14 can be adjusted so that for example changes in length due to thermal influences but also due to mechanical loading and wear can be compensated.

Automatic systems are also known in the state of the art, in which a tension detector (not shown in the Figure) automatically detects the tension of the drive belt 14 and by way of a suitable control arrangement operates an adjusting drive (also not shown) which suitably adjusts the tensioning roller 20.

A substantial advantage of this drive system lies in its good accessibility and its simple structure. In that way faults can be dealt with, at a low level of complication and expenditure. Thus there are no parts whatsoever which can wear or be damaged on the Magnus rotor 8.

Replacement of guide rollers 12 which as can be clearly seen are also accessible from the exterior is thus possible without any problem. Maintenance is also made easier because visual checking can be carried out even in ongoing operation as the interior of the Magnus rotor 8 does not have to be entered.

Figure 5:
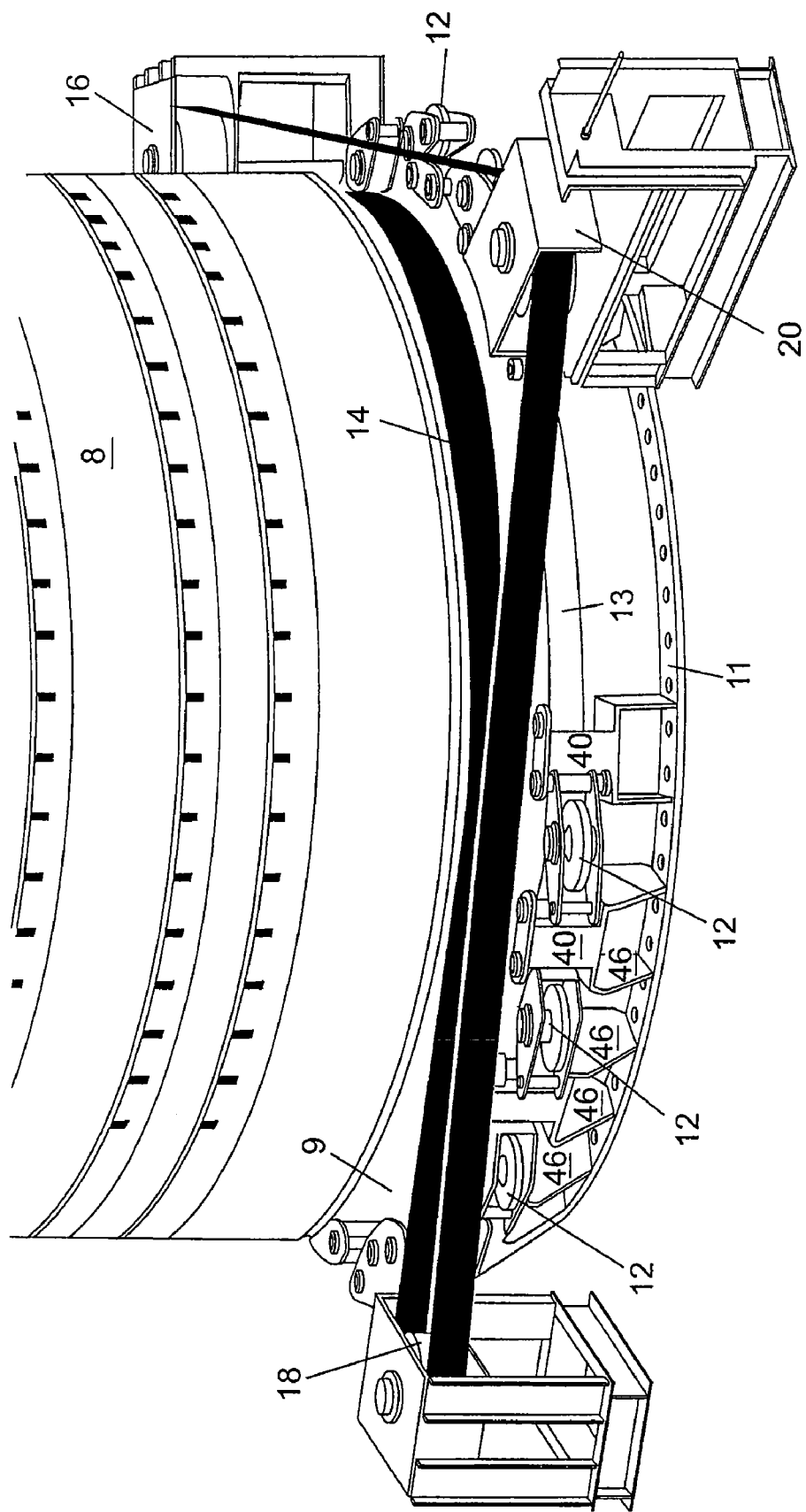
FIG. 5 shows a detail view of the lower region of the Magnus rotor.

FIG. 5 shows in detail the arrangement of the drive belt 14 and the guide rollers 12 at the lower outer periphery of the Magnus rotor 8. While the Magnus rotor 8 is made from aluminium to keep its weight low, provided in its lower region is a drive region 9 of steel. In that drive region 9, the drive belt 14 bears against the Magnus rotor 8 and transmits the drive forces to the Magnus rotor 8. While however aluminium is a relatively soft material and is thus subjected to a higher level of wear, that is not the case with steel. That structure provides a low-wearing drive region which permits reliable operation of the Magnus rotor.

The guide rollers 12 also bear against the Magnus rotor 8 in that drive region 9. As those guide rollers roll against the lower outer periphery of the Magnus rotor 8 throughout the entire operating time of the Magnus rotor 8, a certain amount of wear is also to be expected here. While the guide rollers 12 themselves are accessible from the exterior and can thus be easily replaced, the Magnus rotor 8 itself may not involve any wear which makes it necessary to replace it as that entails an extremely high level of complication and expenditure.

Accordingly provided in the drive region 9 is a guide track 13 which comprises segmented steel plates which in turn are fixed on the drive region 9. The guide rollers 12 roll against that guide track 13. When now the wear limit of the guide track 13 is reached, individual segments of the guide track 13 can be replaced, depending on the nature and extent of the wear. In that fashion the Magnus rotor 8 can be easily kept in a condition of readiness for operation, even when the guide track 13 suffers from wear.

Even if a foreign body passes from the exterior between the guide track 13 and the guide roller 12 and thereby gives rise to damage the segment in question of the guide track 13 and the guide roller 12 in question can be easily replaced.

Figure 6:
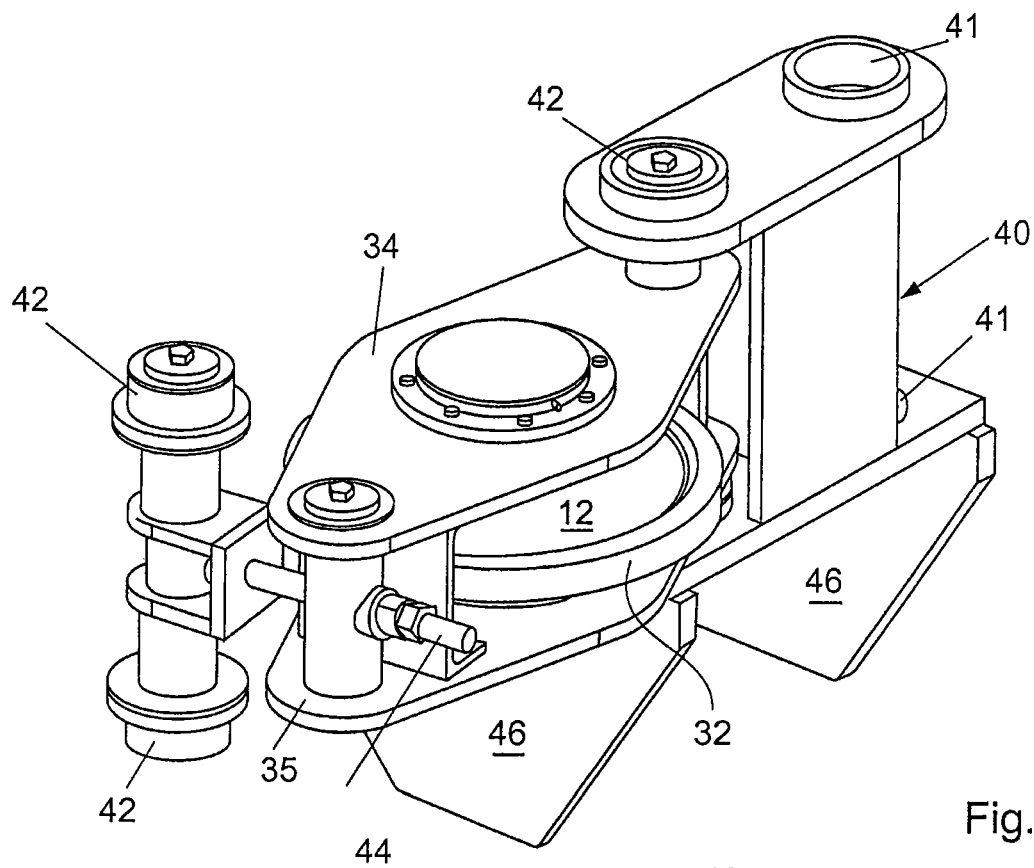
FIG. 6 shows a perspective view of a guide roller and the bearing means thereof.

FIG. 6 shows a perspective view of an embodiment of the guide roller 12 with its associated holder. In this example the guide roller 12 has an elastic covering 32 at its outer peripheral surface. That elastic covering 32 runs against the surface of the Magnus rotor and there against the guide track (see reference 13 in FIG. 5). The elastic covering 32 markedly reduces both the generation of noise during operation of the Magnus rotor due to the rollers 12 rolling against its outer periphery and also the wear on the Magnus rotor.

The roller 12 is rotatably mounted between an upper holding plate 34 and a lower holding plate 35. The unit comprising the roller 12 and the holding plates 34, 35 is mounted pivotably by way of rubber dampers 42 in a holder 40. The holder 40 is in turn connected to the Magnus rotor 8 by way of fixing plates 46.

The unit consisting of the guide roller 12 and the upper and lower holding plates 34, 35 is arranged in this Figure at its right-hand side in that fashion in the holder 40. Disposed at the left-hand side of the unit is a biasing screwthreaded rod 44 connected to further rubber dampers 42. Those further rubber dampers 42 are fitted into the corresponding damper mounting 41 of the adjacent holder 40 so that the result is a continuous chain of holders 40 with guide rollers 12 mounted thereto, which extends completely around the lower outer periphery of the Magnus rotor 8.

The contact pressure with which the guide roller 12 bears against the Magnus rotor 8 and there against the guide track 13 can be adjusted by means of the biasing screwthreaded rod 44. With that structure the rubber dampers 42 on the one hand provide within certain limits for elastic mounting of the guide roller 12 and acoustic decoupling of the guide roller 12 and the holder 40 so that in that way propagation of noise is at least reduced.

The holder 40 is connected to the substructure by way of fixing plates 46. That can be clearly seen from FIG. 5. There (in FIG. 5) it is possible to see the lower flange 11 of the Magnus rotor, on which the fixing plates 46 are mounted with their underside, while the perpendicular rear sides of the fixing plates 46, that face away from the viewing person, are fixed to the lowermost peripheral edge of the Magnus rotor. That fixing can be effected for example by a welded join.

It is also possible to see from FIG. 5 the arrangement of the guide rollers 12 between adjacent holders 40 in which the rubber dampers shown in the left-hand part in FIG. 6 are fitted in the damper mountings 41 (see FIG. 6) of the adjacent holder 40.

Figure 7:
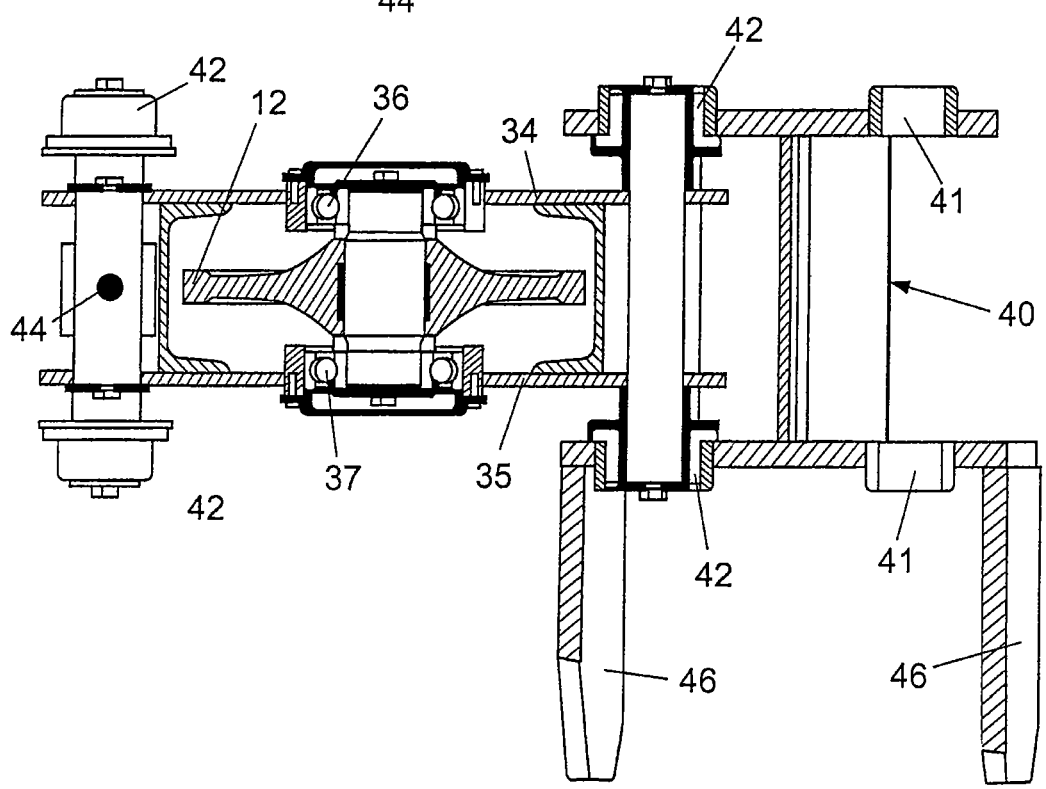
FIG. 7 shows a sectional view of the guide roller and the bearing means.

FIG. 7 shows a sectional view through the arrangement illustrated in FIG. 6. It will be noted however that as a departure from the view in FIG. 6 the guide roller 12 is here formed completely from one material, preferably steel. That guide roller 12 is mounted rotatably by way of an upper bearing 36 and a lower bearing 37 between the upper holding plate 34 and the lower holding plate 35 and that unit consisting of guide roller 12, holding plates 34, 35 and bearings 36, 37 is again provided with rubber dampers 42 which permit mounting of the unit in holders 40, as was already described in the description with reference to FIG. 6. In this respect FIG. 7 clearly shows the damper mountings 41 in the right-hand part of the holder 40, in which the unit with guide roller 12, holding plates 34, 35 and bearings 36, 37, which unit is not shown but is adjacent to the right-hand side of the holder, is fitted into that holder 40 illustrated in the Figure, by means of the rubber dampers 42.

Figure 8:
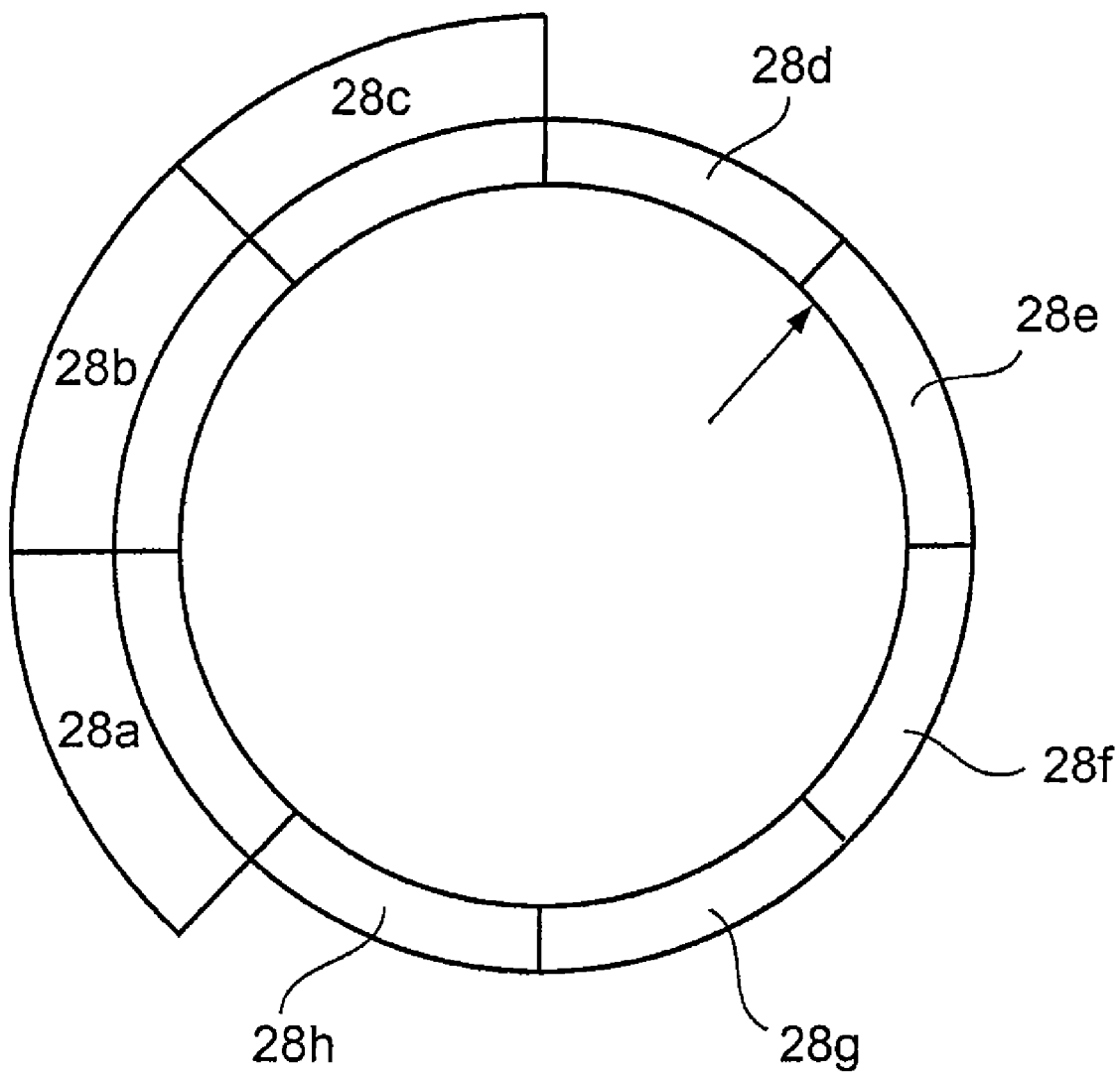
FIG. 8 shows a simplified view of the cover means of the drive and the guide roller.

Finally FIG. 8 shows a simplified view of the Magnus rotor 8 but as a plan view without the end plate and without showing the carrier and the bearing means. Covers 28a to 28h are arranged around the outer periphery of the Magnus rotor 8. In this case the cover means 28a, 28b and 28c are covers under which the rollers and the drive belt are arranged while the covers 28d to 28h cover the guide rollers 12. The segmented structure means that the entire cover means does not have to be removed each time in order to gain access to individual parts of the drive and guide system.

What is claimed is:

1. A Magnus rotor comprising:
   a drive;
   a controller configured to control the drive in such a way that a ratio of a peripheral speed of the Magnus rotor to a mean wind speed is in a ran of 5 to 20 the ratio is determined from a mean wind speed ascertained over a predetermined time interval;
   at least three guide rollers which are arranged at a lower outer periphery of the Magnus rotor and which bear without play against the Magnus rotor, and
   an elastic covering on an outer peripheral surface of each guide roller.

2. A Magnus rotor according to claim 1, further comprising a carrier which is arranged in the interior of the Magnus rotor and carries the Magnus rotor by a bearing.

3. A Magnus rotor according to claim 1 wherein the at least three guide rollers are arranged in uniformly spaced relationship at the lower outer periphery.

4. A Magnus rotor according to claim 1, further comprising an oscillation-damped mounting means for each guide roller.

5. Magnus rotor according to claim 1, further comprising rubber dampers for oscillation-damped mounting of corresponding guide rollers.

6. A Magnus rotor according to claim 1, further comprising a guide track of segmented steel plates at the lower outer periphery of the Magnus rotor, the guide rollers rolling on the guide track.

7. A Magnus rotor according to claim 1, further comprising a drive belt which bears over a predetermined distance against the lower outer peripheral surface of the Magnus rotor.

8. A Magnus rotor according to claim 7 wherein the at least three guide rollers cooperate to guide the drive belt, at least one of the three guide rollers is driven.

9. A Magnus rotor according to claim 8, further comprising a tensioning roller displaceable in a radial direction with respect to the Magnus rotor.

10. A Magnus rotor according to claim 9, further comprising a motor configured to displace the tensioning roller.

11. A Magnus rotor according to claim 1, further comprising a cover that at least partially surrounds the lower periphery of the Magnus rotor and that covers the at least three guide rollers for guiding a drive belt.

12. A Magnus rotor according to claim 11 wherein the cover includes segments corresponding to components arranged therebeneath.

13. A Magnus rotor according to claim 1 wherein the Magnus rotor has a first natural frequency above a highest rotary speed of the Magnus rotor.

14. A method of operating the Magnus rotor of claim 1, the method comprising:
    setting the Magnus ratio of the peripheral speed of the rotor of claim 1 to the mean wind speed in the range of 15 to 20 by controlling the drive which causes the Magnus rotor to rotate.

15. A method according to claim 14, further comprising:
    operating the Magnus rotor at a rotary speed lower than the first natural frequency of the Magnus rotor.

16. A ship comprising at least one Magnus rotor which is controlled by a method according to claim 14.

17. A ship comprising at least one Magnus rotor according to claim 1.

18. A Magnus rotor system, comprising:
    a Magnus rotor including a rotor, a drive, and a controller, the drive and controller configured to cooperate to rotate the rotor such that a ratio of a peripheral speed of the rotor to a mean wind speed is in a range of 5 to 20, wherein the ratio is determined from a mean wind speed ascertained over a predetermined time interval; and
    at least three guide rollers arranged at a lower outer periphery of the Magnus rotor, each of the at least three guide rollers bears against the Magnus rotor;
    wherein the Magnus rotor has a first natural frequency that is higher than a highest rotary speed of the rotor.

19. The Magnus rotor system according to claim 18 wherein the at least three guide rollers are arranged in a uniformly spaced relationship at the lower outer periphery.

20. The Magnus rotor system according to claim 18, further comprising a ship carrying the Magnus rotor.

* * * * *

UNITED STATES PATENT AND TRADEMARK OFFICE
CERTIFICATE OF CORRECTION

PATENT NO. : 8,230,798 B2
APPLICATION NO. : 12/324729
DATED : July 31, 2012
INVENTOR(S) : Rolf Rohden It is certified that error appears in the above-identified patent and that said Letters Patent is hereby corrected as shown below:

In the Claims:

Column 7, Line 19:
"a mean wind speed is in a ran of 5 to 20 the ratio is" should read, --a mean wind speed is in a range of 5 to 20, the ratio is--.

Signed and Sealed this
Seventeenth Day of September, 2013

Teresa Stanek Rea
*Deputy Director of the United States Patent and Trademark Office*